United States Patent [19]
Carter et al.

[11] Patent Number: 5,428,738
[45] Date of Patent: Jun. 27, 1995

[54] LOGICAL EXPRESSION CALCULATION INTERFACE

[75] Inventors: Stephen R. Carter, Spanish Fork; Scott M. Bean, Orem; Randal W. Wright, Highland, all of Utah

[73] Assignee: Novell, Inc., Orem, Utah

[21] Appl. No.: 65,740

[22] Filed: May 21, 1993

[51] Int. Cl.⁶ .............................................. G06F 3/14
[52] U.S. Cl. .................... 395/161; 395/157; 395/160; 395/159
[58] Field of Search ............... 395/161, 155, 157, 159, 395/160, 140; 345/119; 364/709.08–709.1, 710.14

[56] References Cited
U.S. PATENT DOCUMENTS

| | | | |
|---|---|---|---|
| 4,860,204 | 8/1989 | Gendron et al. | 395/140 |
| 4,901,221 | 2/1990 | Kodosky et al. | 395/159 |
| 5,046,024 | 9/1991 | Smith et al. | 395/140 |
| 5,255,363 | 10/1993 | Seyler | 395/159 X |
| 5,313,575 | 5/1994 | Beethe | 395/159 |

OTHER PUBLICATIONS

"LabVIEW: Laboratory Virtual Instrument Engineering Workbench", Product Preview, *Byte*, Sep. 1986, pp. 84–92.

Rosenberg, Dictionary of Computers, Information Processing, and Telecommunications, Wiley, 1987, p. 281.

*Primary Examiner*—Raymond J. Bayerl
*Attorney, Agent, or Firm*—Weil, Gotshal & Manges

[57] ABSTRACT

A system and method for constructing logical, mathematical, and other action-oriented expressions for execution by a computer program. The system and method allows users to more easily design and construct even complex expressions that execute real-time decisions during program execution. The system and method reduces the complexity of creating such expressions by replacing logical constructs with visual equivalents generated by a user in step-by-step fashion on the computer display screen.

10 Claims, 11 Drawing Sheets

CALCULATION FOR: DUECOMP    TYPE: FORM CHANGE

FILE   EDIT   VIEW   FUNCTIONS   HELP

IF
ADVANCE>=TOTAL
   DO
   ADVANCE-TOTAL

OTHERWISE
   0

OPERATORS
| + | < | > | < |
| - | <= | >= | AND |
| x | = | OR | NOT |
| / |

ARITHMATIC
@ABS
@ACOS
@ASIN
@ATAN
@ATAN2
@COS
@DEGREES
@EXP
@FACT
@INT
@LN
@LOG
@MAX
@MIN
@MOD
@POWER
@PRODUCT

SYNTAX: @ABS(NUMBER)    EXAMPLE: @ABS(-3) RETURNS 3

CALCULATION FOR: DUECOMP    TYPE: FORM CHANGE

FILE  EDIT  VIEW  FUNCTIONS  HELP

OPERATORS

| + | < | > | <> |
|---|---|---|----|
| - | <= | >= | AND |
| x | = | NOT | |
| / | OR | | |

FORM OBJECTS

AIRFARE
CERTIFY
CONTINUE
DEPARTMENT
DUE
DUECOMP
DUEEMP
EXPENSES
EXPSUM
LODGING
MEALS
NAME
OFFICE
OTHER
PHONE
REPORT_DATE
TOTAL

IF

OTHERWISE    INSERT

DO

SYNTAX: @ABS(NUMBER)    EXAMPLE: @ABS(-3) RETURNS 3

LOGICAL EXPRESSION CALCULATION INTERFACE

BACKGROUND AND SUMMARY OF THE INVENTION

The present invention relates to a user interface designed for use in a computer program known as WordPerfect InForms, in particular an interface used for creation of calculation sequences. WordPerfect InForms is a software product that provides the capability of designing and maintaining elaborate electronic and printed forms. Its Designer component, in which the present invention is incorporated, makes extensive use of real-time decisions. For example, the user may wish to extract information required in a form from a database, but only if that information meets certain criteria at the time it is requested. Also, the user may wish to make choices concerning how to analyze, summarize or display information depending on circumstances that cannot be anticipated.

Mathematical and logical expressions to accomplish such goals can be both powerful and complex. Such expressions have been traditionally created by mathematicians, computer programmers or engineers, through the use of logical AND and OR statements, assignment statements and parentheses. The ability to make multiple levels of decisions with branching, using the notion of logical AND and OR in conjunction with other logical and arithmetic operators permits the user to create very powerful expressions. Such expressions, however, are also very complex.

The system and method described here reduce the complexity of creating such expressions by replacing those logical constructs with visual equivalents generated by the user in step-by-step fashion on the computer display screen. These constructs are of two types: decision boxes and result boxes. The former type contain IF, ELSE IF and SELECT statements; the latter contain DO and OTHERWISE statements. As will be seen, the visual clarity of the method of the present invention enables the user to more quickly grasp the possible results of his/her decisions, thus making it easier to create the calculations and find logical errors they may contain.

The nature of the invention will be made more apparent by the detailed discussion which follows and which refers to the following drawings:

DETAILED DESCRIPTION OF THE INVENTION

Figure 2:
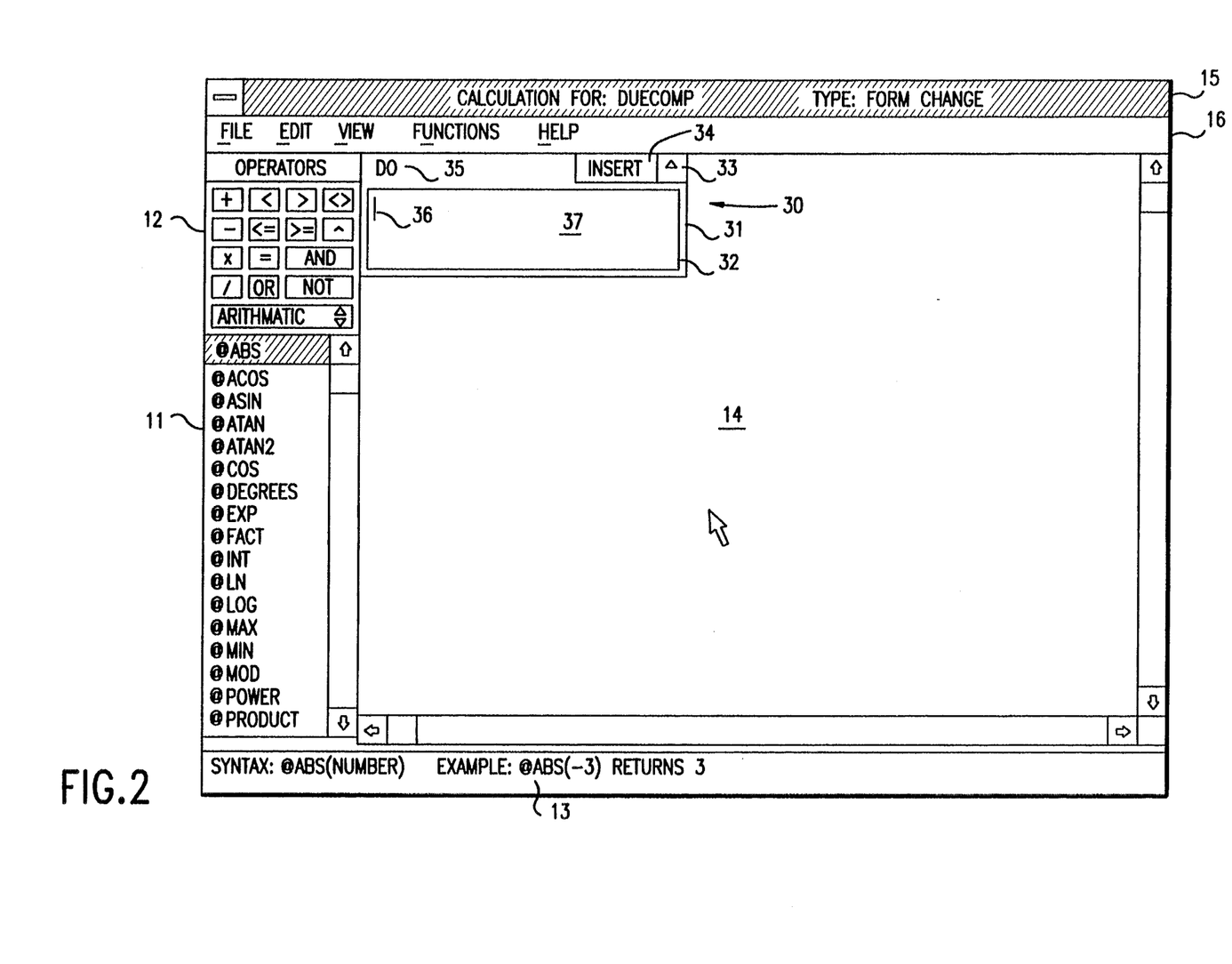
FIG. 2 illustrates the initial appearance of the calculation screen used on the display to practice the present invention.

FIG. 2 shows the initial appearance of the calculation screen of WordPerfect Informs, the software product in which the invention is presently embodied. The calculation screen consists of several components: the function list 11, the operator box 12, the syntax and example window 13, and the working area 14. Within the working area, as will shortly be described, calculation boxes contain the elements of the calculations themselves. The title bar 15 located at the top of the window shows which form object the calculation affects (here whether compensation is due, selected as described below), and the menu bar 16 contains a list of items, each of which includes a pull-down menu.

Function list 11, located, in the present embodiment, along the left edge of the working area, contains a list of functions available for use in the calculations. In the current embodiment of the present invention, several categories of functions are available, including arithmetic (as shown in FIG. 2), text, day/time, financial, statistical and logical. Functions can be chosen by selecting the function category from the function pop-up list, then double-clicking the selected function within the category. They can also be selected by category and then within category from the pull-down Function menus in menu bar 16 or they can be typed in directly.

Operator box 12, located, in the present embodiment, at the upper left corner of the working area, contains a list of available operators for inclusion in the calculation, such as $>$, $=$, AND, OR, etc. Operators may be selected by clicking on them with the mouse button. They can also be typed in directly using the appropriate keyboard symbol.

The syntax and example window 13, located along the bottom of the working area, shows how to use the selected function and gives a brief explanation of its effect. In FIG. 2, for example, the chosen function is @ABS, and the window explains that that function returns the absolute value of the Number placed in parentheses following the ABS and gives an example where $-3$ is placed in parentheses and the function returns 3.

Calculations allow the user to determine the value of a form object, make changes to form object values or attributes, make additions or changes to databases, query a database, or perform user-defined functions, such as Windows' DLLs (dynamic link libraries). Calculations consist of functions, arguments, and operators. They range from simple arithmetic statements (such as $4+5$) to complex financial or statistical formulas.

Most calculations (with the exception of the @SETVALUE function provided in the current embodiment of the present invention) change the value only of the form object for which they are created. However, they can change the attributes of other form objects. For example, in a form having entry fields called "subtotal" and "total," a calculation created for an entry field "total" would not change the value in an entry field above called "subtotal" without using the @SETVALUE function, but it may hide the "subtotal" field. Calculations often reference other form objects in the form. For example, the calculation (cost * quantity) would return the value of entry field "cost" multiplied by the value of entry field "quantity."

A calculation expression can be created after at least one field in a form has been selected. In the current embodiment, the calculation interface of the present invention is selected from a pull-down menu by way of a Calculation Worksheet screen shown in FIG. 1.

Figure 1:
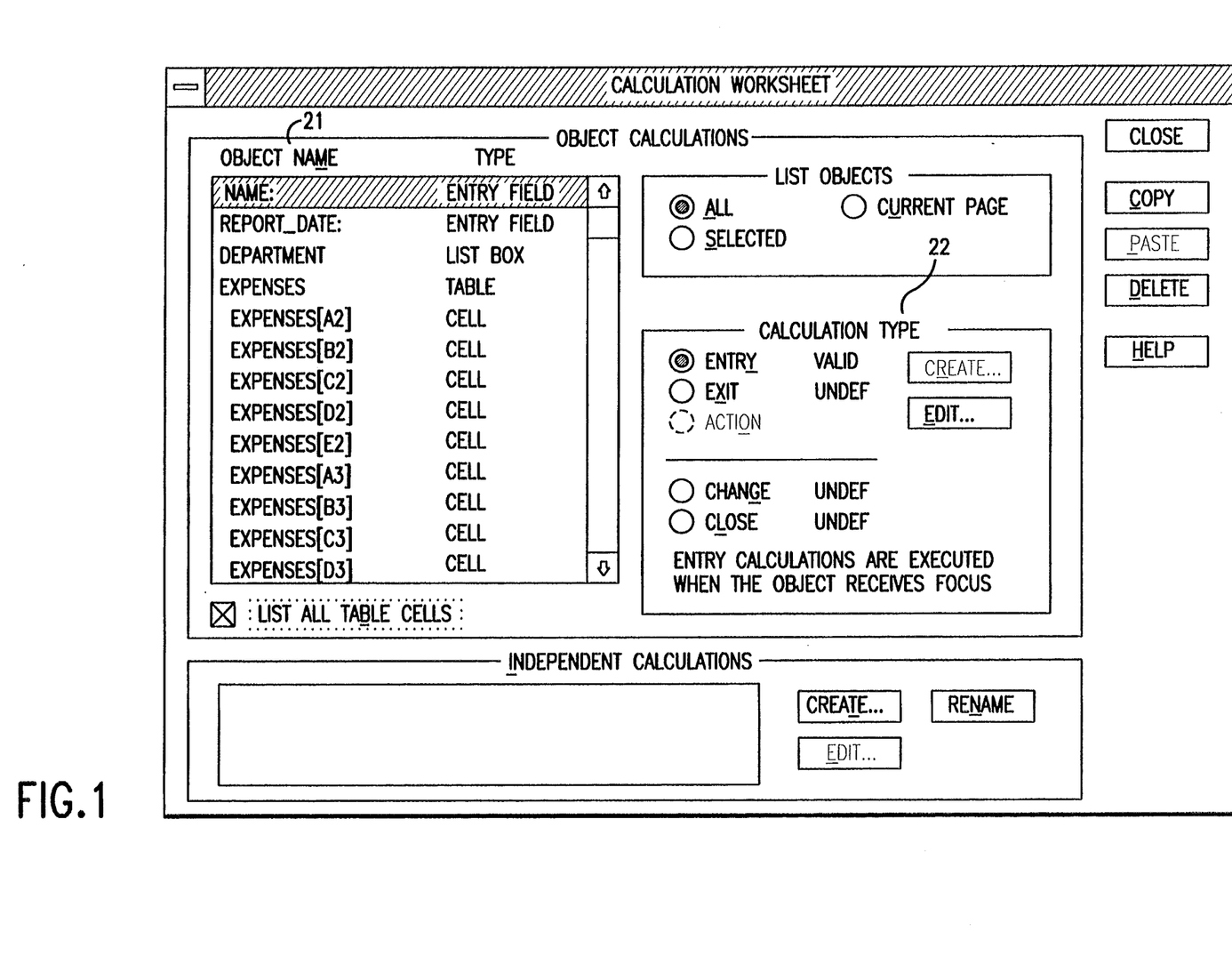
FIG. 1 shows the Calculation Worksheet screen by which the user selects and controls the creation of a calculation.

In order to create a calculation, the user calls up the Calculation Worksheet screen shown in FIG. 1 by choosing the Calculation function from a menu of object Properties that appears in the program's initial screen, after the form object to which the calculation relates has been created or opened. The user next selects the object for which it is desired to create a calculation from the Object Name list box 21 in the Calculation Worksheet. (This is a list of named objects present in the form.) Then, in the preferred embodiment, the user selects the desired type of calculation from the radio buttons in the Calculation Type area 22, and finally chooses the CREATE option. If a calculation has already been created for the selected object, the CREATE option will not be available, and the user will have to use the EDIT option instead, to modify the existing calculation.

The Calculation Type determines when a calculation will be performed, and in the preferred embodiment of the present inventions, several calculation types are available in area 22. They are explained in the following table:

| Calculation Type | Description |
| --- | --- |
| Entry | The calculation is performed as soon as a user moves the focus to the form object that contains the calculation, either by tabbing to it, by using the mouse, or as a result of a calculation action event. |
| Exit | The calculation is performed after the user leaves the form object, either by tabbing to another form object or by moving the focus with the mouse. |
| Action | This option is available only for action buttons. The calculation is performed as soon as the user chooses the action button. Merely tabbing to it does not instigate the calculation. |
| Change | The calculation is checked to see whether it needs to be recalculated whenever any change is made to the form, including when the form is opened. |
| Close | The calculation is performed when the form is closed or when a record is added to or modified in a database. |

Referring now to the working area 14 shown in FIG. 2, when the user selects the CREATE option from a menu, the working area 14 has the appearance shown. A single logic box 30 of the DO format is presented. Logic box 30 comprises an outer frame 31, an inner frame 32 outlining the working area of the box, a Maximize button 33, an INSERT button 34 and a label 35, here a "DO" label. The cursor 36 is initially positioned in the working area 37. The title bar 15 indicates that the form object for which the calculation is being created is called DueComp and that the calculation has been chosen to be of the Change type. As will be apparent, the calculation in this example determines whether an advance payment to an employee for travel expenses or the like exceeds the total expenses actually incurred and therefore whether additional reimbursement is required.

The user can enter the desired calculation by typing the desired formulas in the working area of the logic box or, in the case of functions or operators, using the mouse as described above. If more room is needed to view or edit the text being placed in a calculation box, the user may enlarge it by clicking on the Maximize button. When the box has been maximized, a Minimize button will appear in the upper right corner, permitting the user to reduce the box to its normal size when desired.

In some circumstances, such as the circumstances of the present example, the user may want to create a calculation that uses different formulas depending on the value of a condition. The present invention enables this to be done in a novel and easy-to-use way. A user desiring to create such a calculation can add an IF box above the DO box, either by clicking on the INSERT button 34 in the currently active DO box 30 or by choosing the INSERT command from the pull-down Edit menu. (In this invention, the term "above" means "before" in a logical sense.) The INSERT Options item on the Edit menu permits the user to insert the IF box above or below the current DO box.

Two alternative boxes must exist below an IF box: a DO box, for use if the condition is satisfied, and an OTHERWISE box, for use if the condition is not satisfied. Therefore, when an IF box is added above an existing DO box, an OTHERWISE box will automatically appear beneath the IF box. As will be demonstrated later, there are also circumstances where a second or even more levels of conditions should be tested before an OTHERWISE box is appropriate, and in such circumstances one or more ELSE IF boxes can be created.

Figure 3:
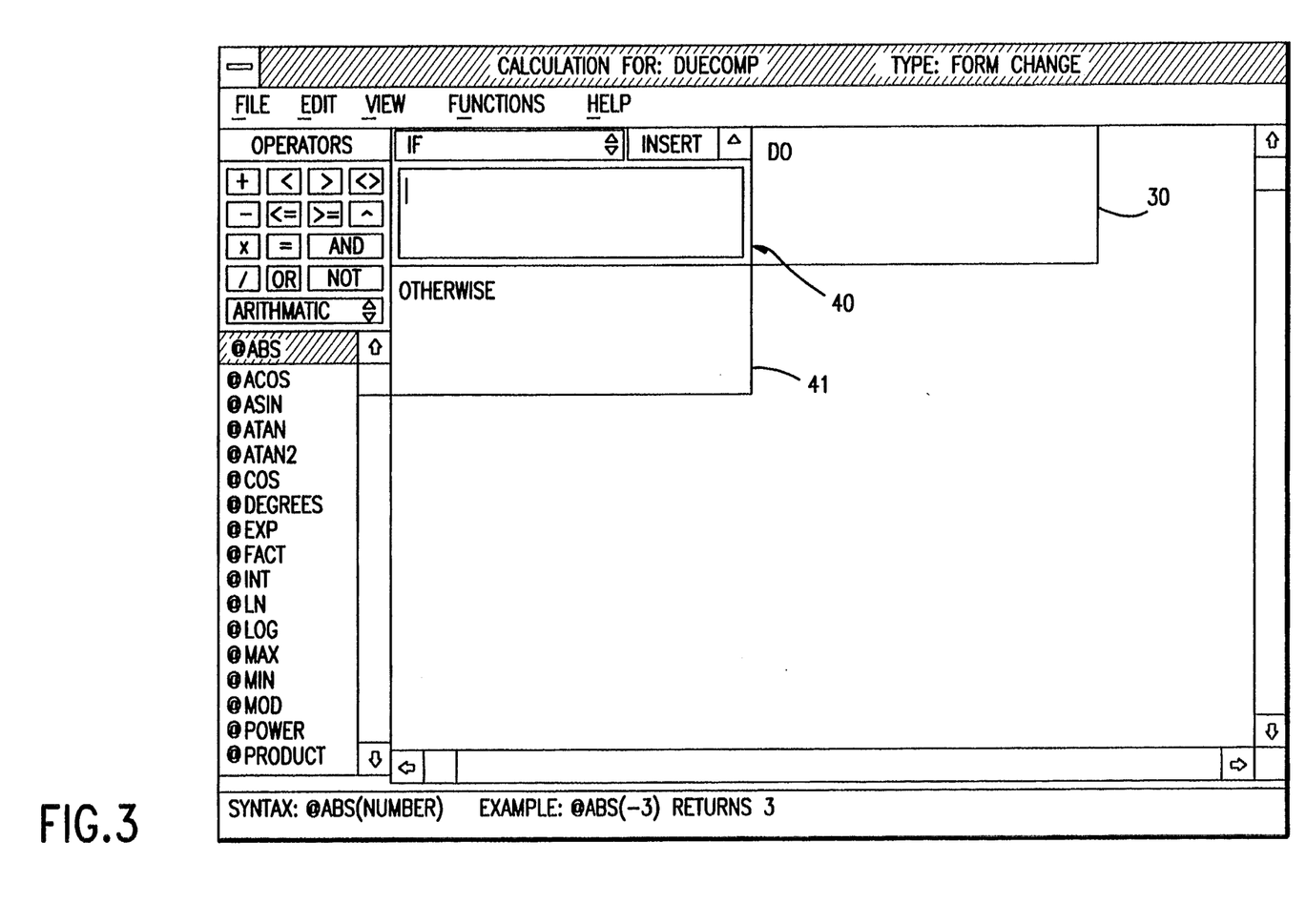
FIG. 3 shows the appearance of the calculation screen of FIG. 2 after an IF statement has been added.

FIG. 3 shows the appearance of the calculation screen after an INSERT command has been entered in DO box 30. DO box 30 has moved to the right, or below—in a logical sense—the inserted IF box 40. As mentioned, an OTHERWISE box 41 has also appeared, to account for the event that the condition tested for in the IF box is not satisfied. The box in which the cursor currently resides is considered the "live" box, and hence has the INSERT and MAXIMIZE buttons.

Figure 4:
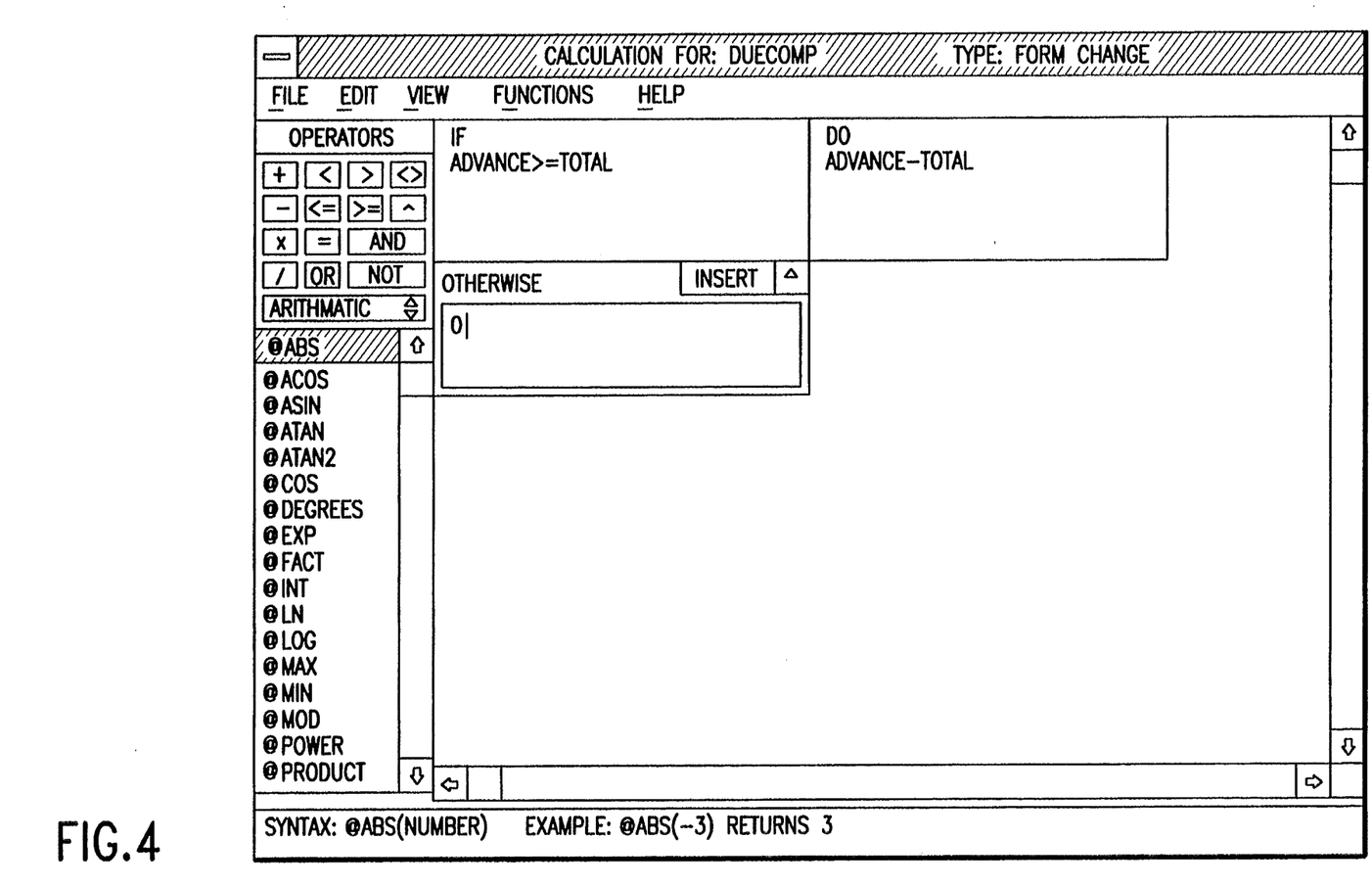
FIG. 4 shows the appearance of the calculation screen of FIG. 3 after calculation terms have been added.

FIG. 4 completes the illustration of the current example, by showing the calculation screen after the content of the calculations have been entered. As will be understood, the calculation first involves testing, in IF box 40, whether the quantity Advance is equal to or greater than the quantity TOTAL. If that condition is satisfied, compensation is due and the DO box calculates the amount by subtracting TOTAL from Advance. If the condition is not satisfied, the underlying computer program proceeds to the OTHERWISE box, where the user has chosen to make the result the display or use of the number 0.

Figure 5:
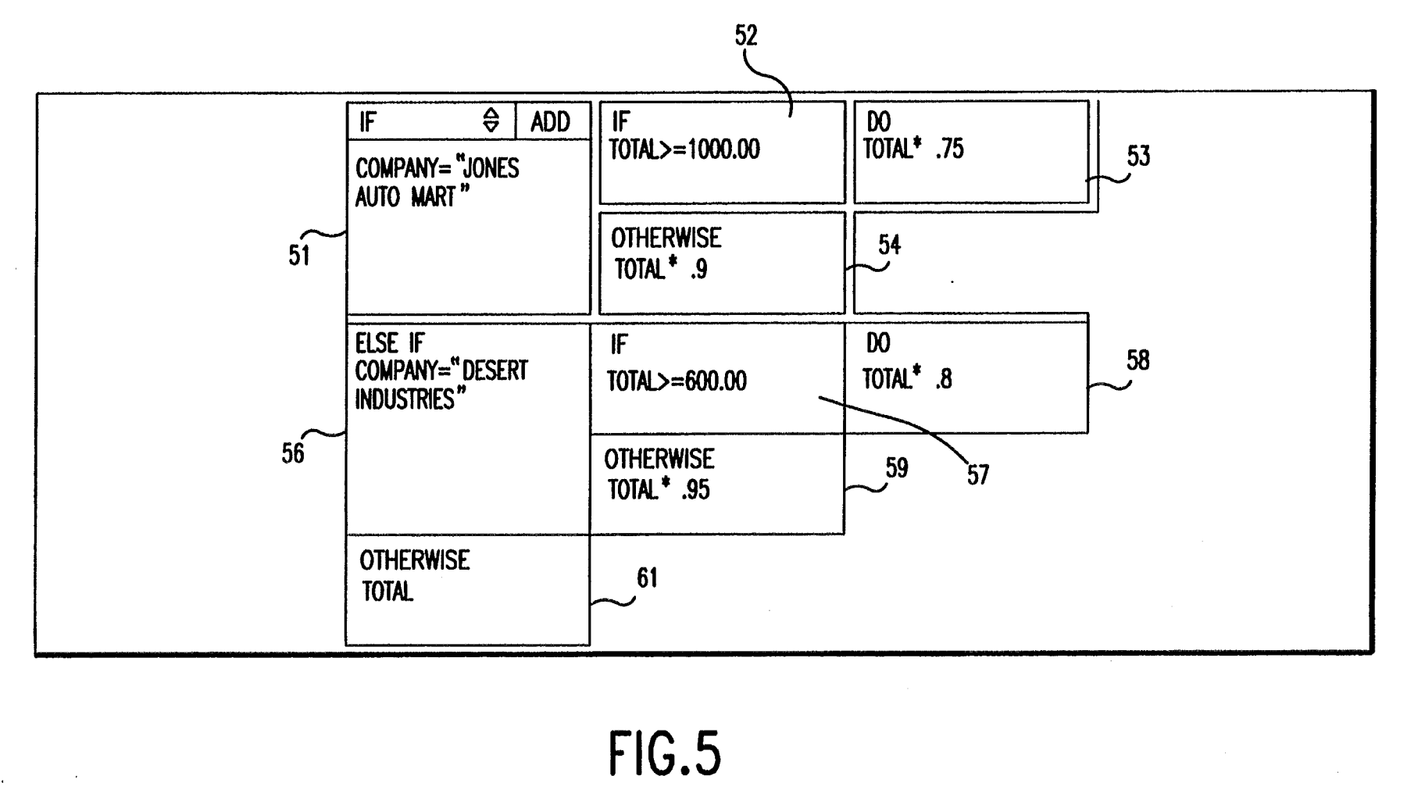
FIG. 5 shows how another complex calculation is constructed according to the present invention.

FIG. 5 shows a more complex calculation, after it has been fully implemented using the procedures just described. In FIG. 5, which includes only the working area 14, conditional calculations are shown which calculate a discount rate. Referring to the Figure, IF box 51 tests to see if the Company named is Jones Auto Mart. If that condition is met, the expression moves to the fight, to another IF box 52, and tests whether the quantity Total is equal to or greater than $1000. If that condition is also satisfied, the calculation moves again to the fight, to DO box 53, where it multiplies the Total by 0.75 to arrive a final number. If, however, the condition in IF box 52 is not met, i.e., if Total is less than $1,000., the calculation proceeds to OTHERWISE box 54 and calculates an answer by multiplying the Total by 0.90. Returning to the initial condition test performed in box 51, if Company does not equal Jones Auto Mart, the calculation moves downward, to ELSE IF box 56, where it tests for equality between Company and "Desert Industries." If that condition is satisfied, a further test is performed in IF box 57 to determine whether Total is equal to or greater than $600. If that condition is met, the calculation proceeds to DO box 58, where Total is multiplied by 0.8 to arrive at the answer. If the condition set forth in IF box 57 is not met, i.e., if Total is less than $600, the calculation proceeds downward, to OTHERWISE box 59 where the Total is multiplied by 0.95. If the ELSE IF condition in box 56 was not met, however, the calculation proceeds downward to OTHERWISE box 61, where the Total is left undiscounted.

The user would create the boxes shown in FIG. 5 in a step-by-step manner shown in FIGS. 6a–6d, as he/she worked through the calculation logic. Each click of the mouse would create the next phase of the calculation, and the actual commands could be entered step-by-step or after the structure had been created.

1. The user will click on the INSERT button on the initial DO box, thereby causing the DO box to move to the fight, an IF box to appear where the DO box had been, and an OTHERWISE box to appear below the new IF box. See FIG. 6a. The condition—Company="Jones Auto Mart"—can now be inserted in the first IF box.

2. The user then moves the mouse to the DO box in its new location and clicks on the INSERT button of that box, thereby causing another IF box to be inserted, with its associated OTHERWISE box, and the DO box moves to the right again. The screen then has the appearance shown in FIG. 6b. At this point, the condition to be tested if the Company="Jones Auto Mart" condition is satisfied, may be entered. That condition is Total> = 1000.00. The associated DO box command, Total* 0.75, may also be entered. Also the OTHERWISE box may be filled in with the calculation to be followed if the condition Total> = 1,000.00 is not met: Total* 0.9.

3. The user can next generate the structure of boxes needed to check the condition to be tested if the condition Company="Jones Auto Mart" is not satisfied: Company="Desert Industries". That is done by moving the cursor to the OTHERWISE box created in the left-most column, activating it by clicking anywhere in the box, and then clicking on the INSERT button to add associated DO and OTHERWISE boxes. At this point, the display has the appearance shown in FIG. 6c. At this point, it will be noted, the IF box below the original IF box now bears a label ELSE IF, reflecting the fact that it is a condition to be tested if the initial condition is not satisfied.

4. Next, the user completes the box structure by activating the DO box associated with a positive condition Company="Desert Industries" and inserting an IF box to test for the size of the quantity Total. When the INSERT button is clicked in that DO box, another IF/OTHERWISE pair of boxes are inserted, and the screen display assumes the appearance shown in FIG. 6d.

Figure 6A:
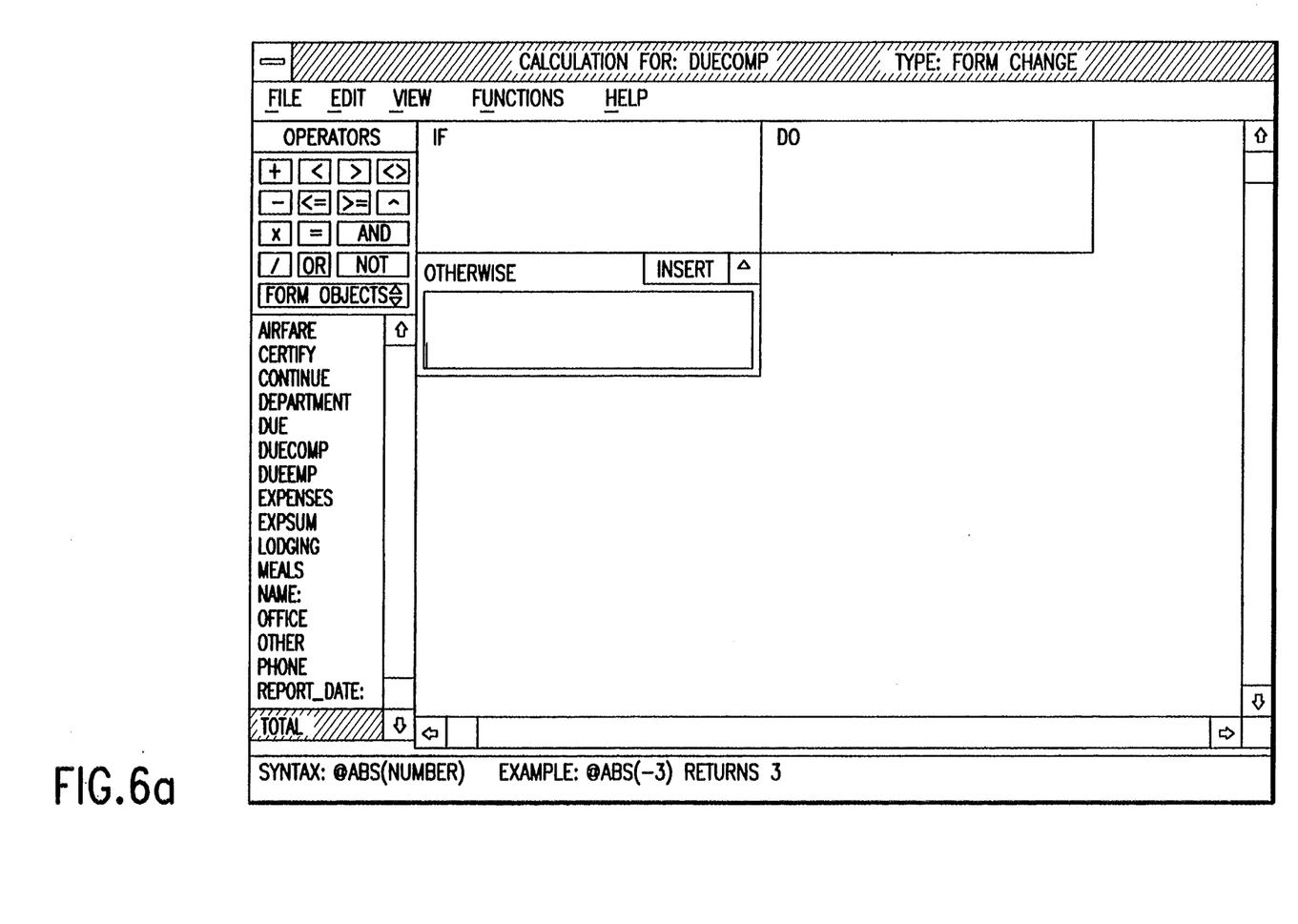
FIGS. 6a–6d show how the calculation of FIG. 5 is constructed in step-by-step fashion.
Figure 6B:
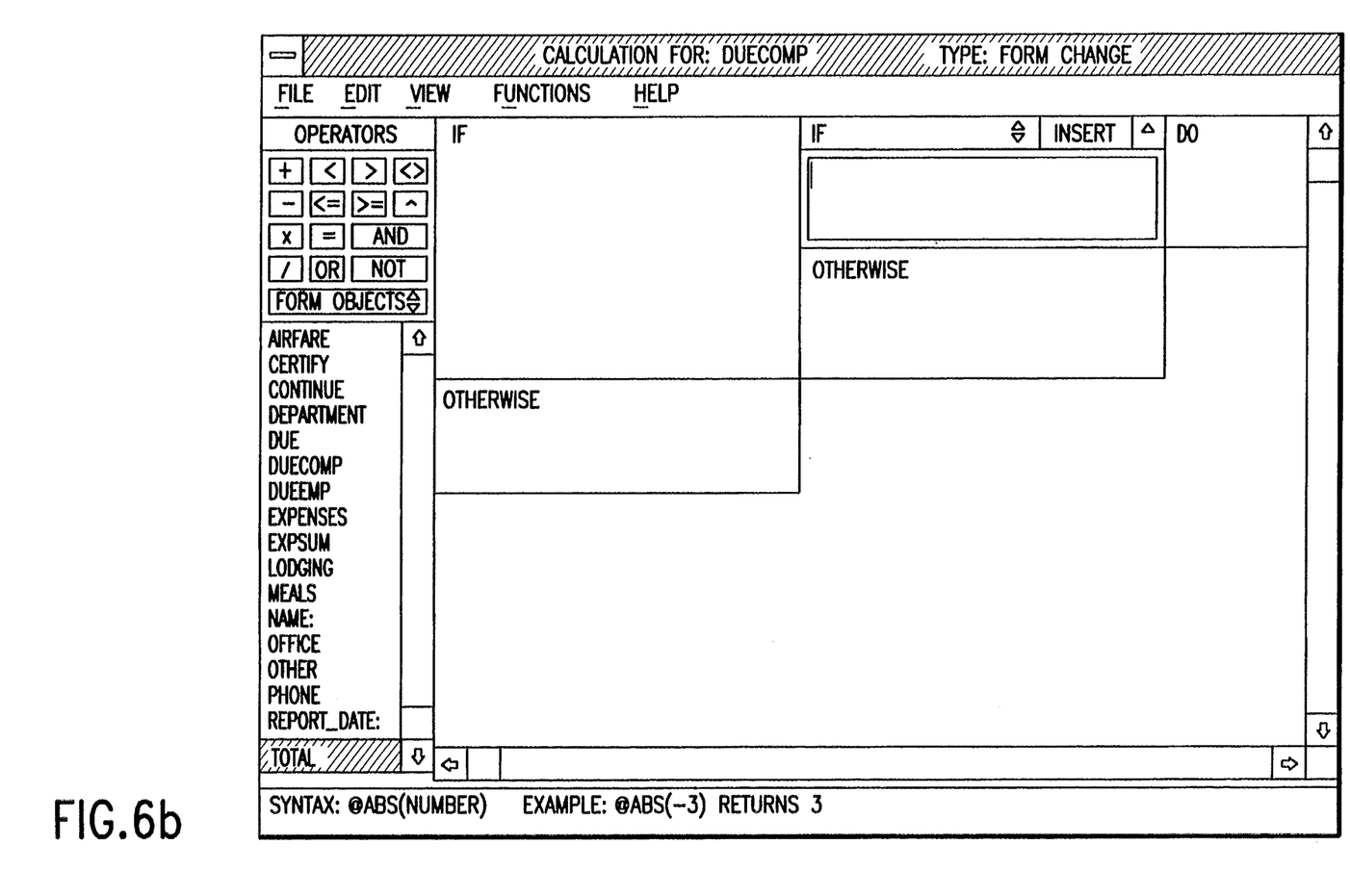
Figure 6C:
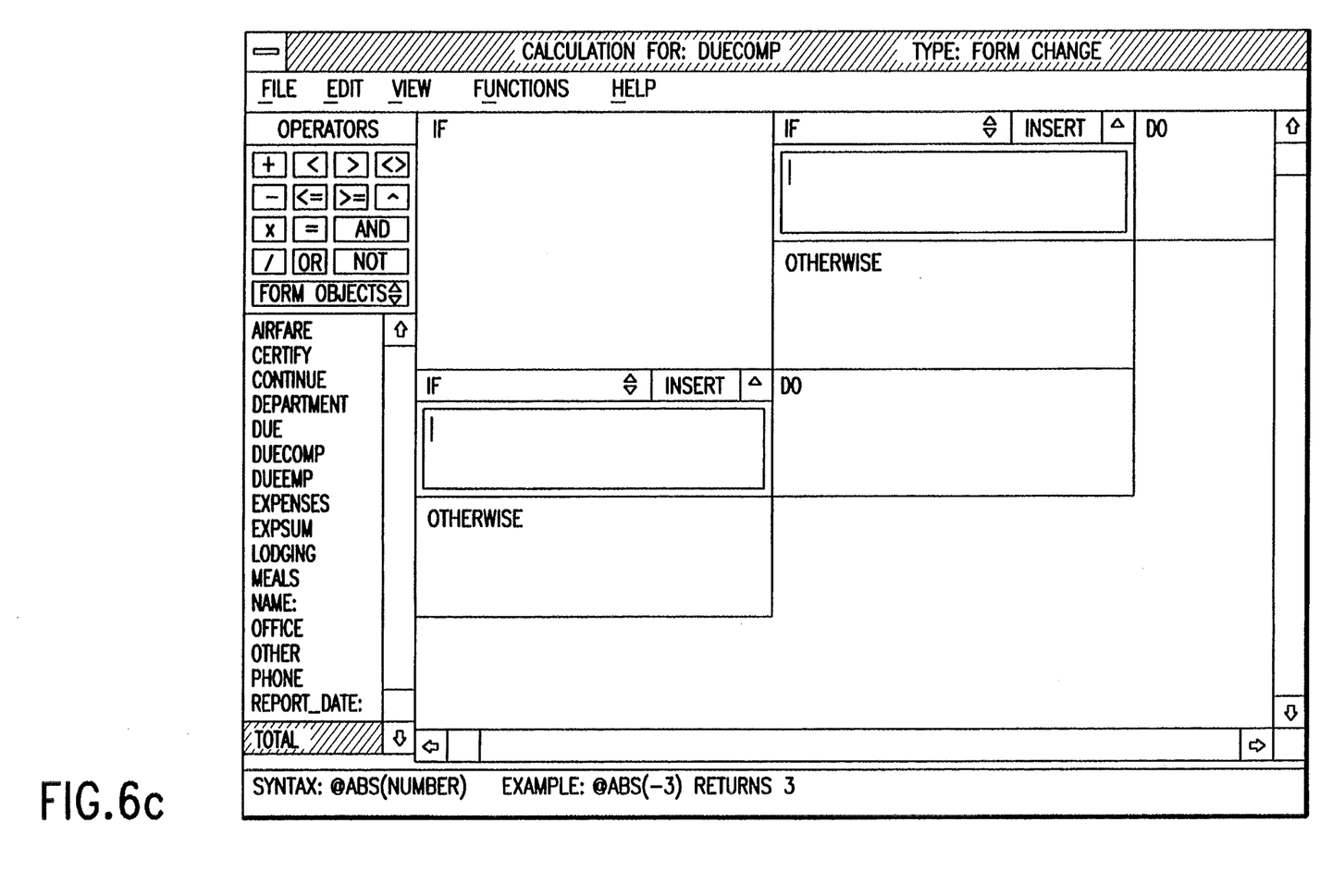
Figure 6D:
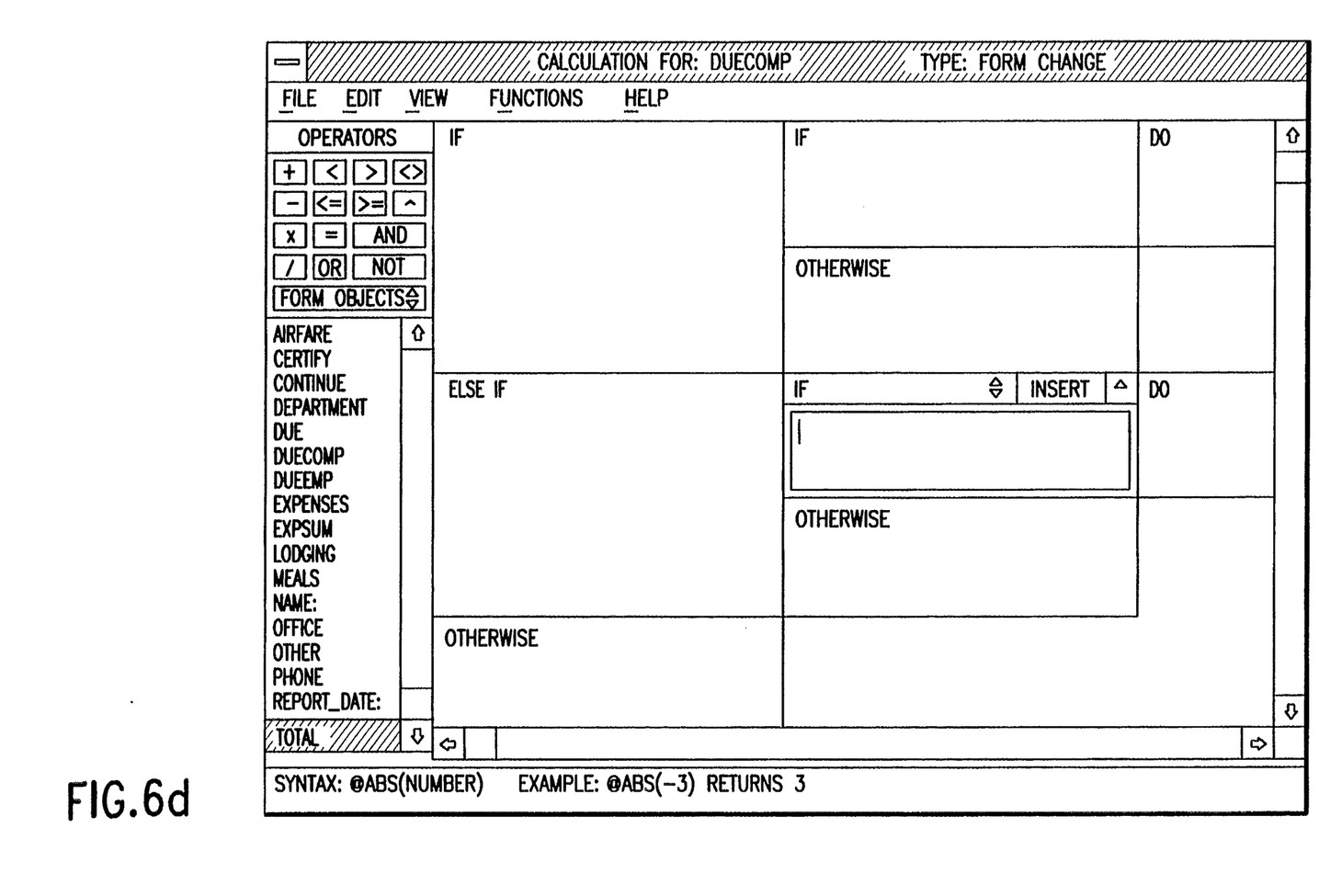

5. At this point the logical structure has been created and the remaining (or all) the expressions can be inserted.

While the foregoing calculation is easy to understand, indeed almost simplistic, when created and viewed according to the present invention, its creation in a traditional sense would be beyond the capabilities of untrained persons. In traditional notation, the calculation would be expressed as follows:

If (the Company is Jones Auto Mart, then (if the Total is equal to or greater than $1000, then return Total * 0.75) otherwise (if the Total is less than $1000, then return Total * 0.90)) else if (the Company is Desert Industries, then (if the Total is equal to or greater than $600, then return Total * 0.80) otherwise (if the Total is less than $600, then return Total·* 0.95)) otherwise return Total.

It will be apparent that the system of the present invention, the step-by-step creation of a visual representation of the logical components of the calculation, makes it far easier to construct even complex calculations. The formation of the boxes on the screen, along with the highly structured manner in which they are created, assists the user in understanding the relationship between them and the flow of decisions throughout the expression. The interface guides the user into understanding his/her expression to be much like a decision tree or flow chart, but adds the additional element of dynamic creation and deletion of branches or termination points on demand.

Figure 7:
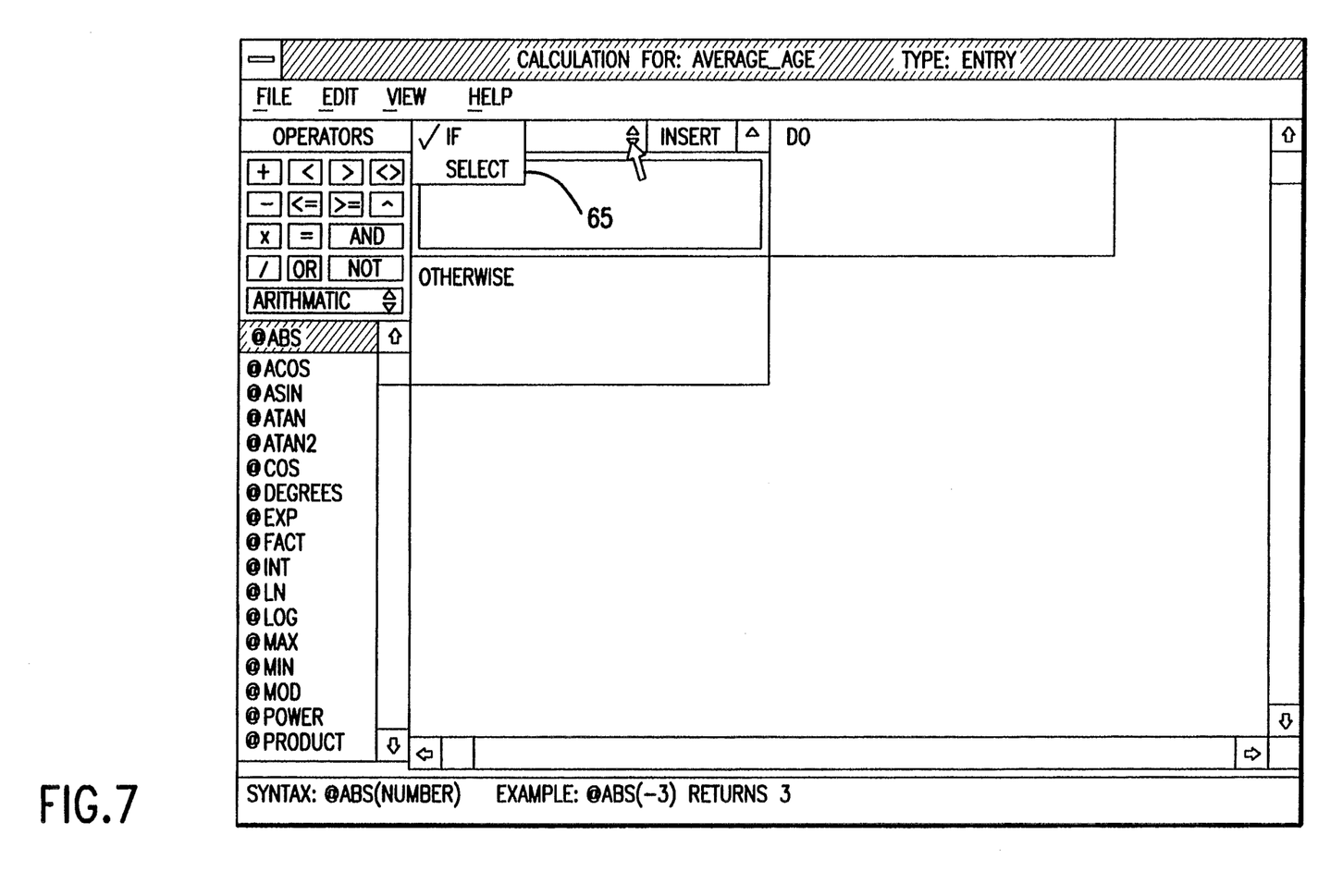
FIG. 7 shows how the present invention provides for a SELECT option.
Figure 8:
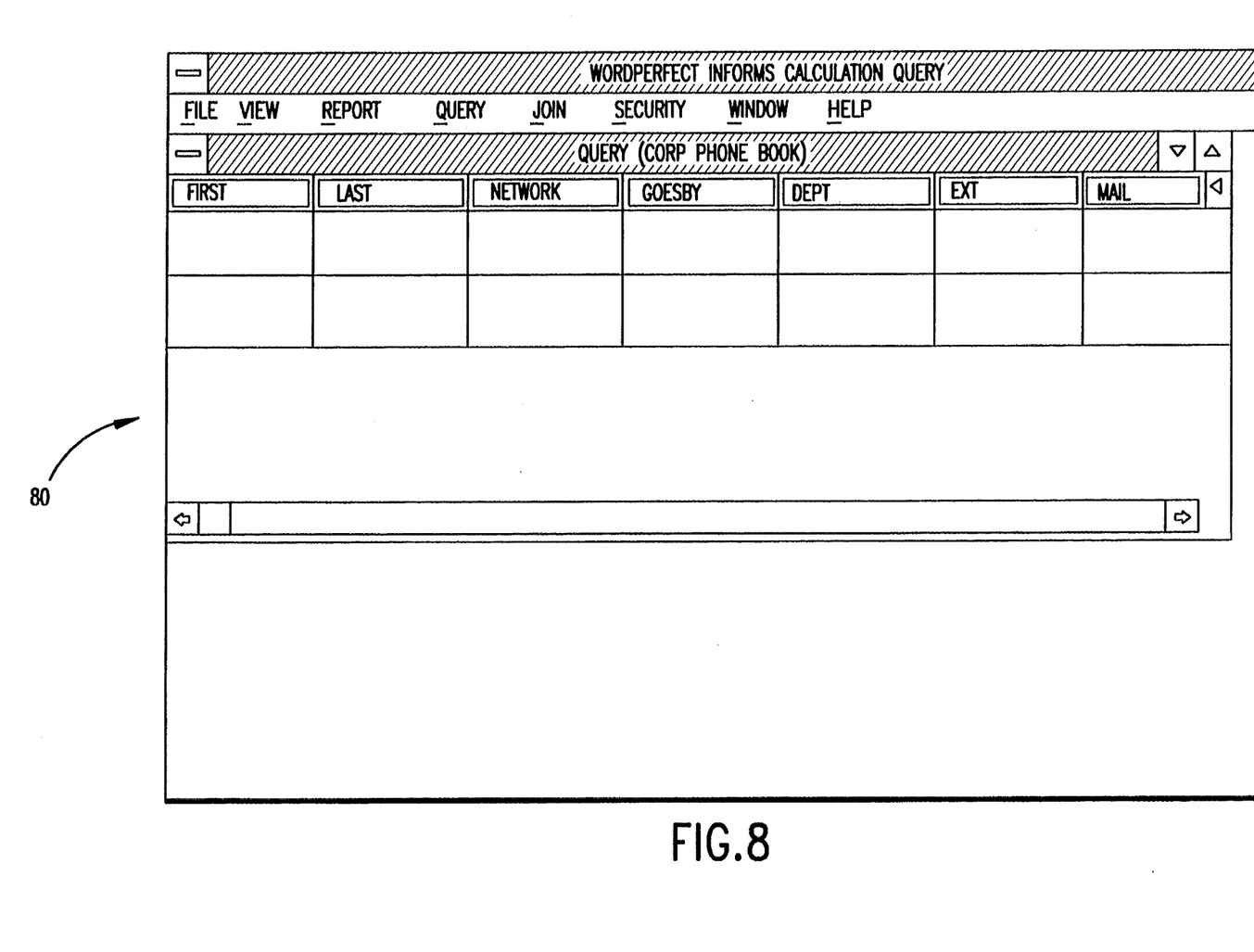
FIG. 8 shows the query window used to implement the SELECT function.

The present invention can also be used to select records from a database. If a form is linked to a database, a user can perform calculations according to the present invention on any data in the database as well as data contained in the current form. For example, a form might contain a field to calculate the average age of all employees whose records are contained in a database. To accomplish this result, as shown in FIG. 7, the user opens a form that has already been linked to a database or creates a database link for the open form. Next, the cursor is positioned in the IF box in which the selection is to be performed. (It is possible that the IF box will have first to be created, as described above.) When the user clicks on the IF box, a menu of choices, including a choice labelled SELECT, will appear in a pop-up list 65 at the top of the box. Once the user chooses SELECT, a query window 80 appears, as shown in FIG. 8. To perform a calculation on selected records in a database field, the user must specify the criteria for the data shown in the query window. As is apparent from the Figure, query window 80 contains columns headed by the name of each field in the database and permits the user to specify criteria for use in selecting records from the database. This specification is then saved, and the query window closed. If no criteria are specified, the calculation in the "DO" box will use all records in the database field named.

After the criteria for selection of records is made, the user clicks on the "DO" box that is next to the "SELECT" box containing the query and creates the calculation to be performed on the selected fields. The calculation should reference a database field as would any other calculation. In the present embodiment of the invention, the name of the referenced database field is preceded with "DB", to indicate that the named field comes from the database rather than from the form itself. If no records are found satisfying the query conditions, the calculation specified in the "OTHERWISE" box is performed.

According to the invention, IF and SELECT boxes can be deleted using the Delete function from the Edit menu. Deleting an IF or SELECT box causes the deletion of any DO or OTHERWISE boxes that are associated with the deleted IF or SELECT.

Calculations can be "independent." An independent calculation works just like any other calculation, except that its result is not displayed in a form object. Instead, the result of an independent calculation would be used in another calculation. Even though independent calculations are not tied to any object, they can be used only in the form in which they were created. An independent calculation, for example, might determine the sales tax rate based on the contents of the "State" entry field. A calculation assigned to a "Tax Due" entry field would calculate the amount of tax due as the contents of the "Subtotal" entry field multiplied by the value returned by the independent calculation.

An independent calculation can be created by choosing the Calculations option from the Properties menu and then choosing the Create function in the Independent Calculations group box of the Calculation Worksheet shown in FIG. 1. Once the user enters a name for the calculation in the Name text box, the calculation is created as described above. When the calculation has been created, the user chooses the Close/Save function from the File menu in the calculation window and then the Close function from the Calculation Worksheet dialog box.

The user can now use the value returned by the calculation as arguments in other calculations, by selecting Independent from the function pop-up list, then double-clicking the chosen calculation. The user can also select Independent Calcs from the Functions pull-down menu, then select the chosen calculation.

In each case, the computer system is programmed in a manner that will be understood by those skilled in the art, to store, manipulate and recognize the logical meaning of the boxes created by the user and to cause the appropriate actions to be taken in accordance with the results of the calculations.

As indicated, the present invention replaces logical, arithmetic, and precedence operators with two types of visual equivalents, decision boxes and result boxes. Boxes of the former type, containing expressions that make decisions, are labeled IF, ELSE IF and SELECT; boxes of the latter type, which contain expressions reflecting results of decisions, are labelled DO and OTHERWISE.

A calculation branch consists of an "IF" box and any other "IF" boxes, "DO" boxes, or "OTHERWISE" that are associated with it. To identify a calculation branch, place the insertion point in an "IF" box. All of the calculation boxes in the current branch are highlighted.

Calculation branches can be copied or moved. Copying or moving a calculation branch copies or moves the structure of the branch along with the text. In the present invention, the user can accomplish this by placing the insertion point in the "IF" box that begins the branch to be copied or moved. To copy the branch while preserving the original, the Copy command is chosen from the Edit menu. To move the branch to another location in the calculation, removing it from the original position, the Cut command is chosen from the Edit menu. The user clicks the calculation box to which he/she wants to copy or move the branch and then chooses the Paste command from the Edit menu.

The practical uses for this method extend to any application where logical flow and decision-making design work is required. While the invention has been described in its present embodiment of an electronic forms program, its uses extend well beyond that particular application.

We claim:

1. A computer system for visually representing logical and mathematical expressions comprising:
   a. means for displaying a display window, the display window comprising:
      an IF box created by a user for entry of an expression for determining the value of a condition;
      a DO box for entry of an expression representing a calculation to be performed in response to a first value of the condition determined according to the expression displayed in the IF box; and
      an OTHERWISE box created automatically in response to creation of the IF box, for entry of an expression representing a calculation to be performed in response to a second value of the condition determined in the IF box;
   means for recognizing a logical relationship in a calculation of the displayed boxes and interpreting the expressions contained in the boxes; and
   means for causing the computer system to determine the value of the condition in the IF box and then, in response to its value, for performing either the calculation in the DO box or the calculation in the OTHERWISE box.

2. The system of claim 1 wherein the user may enter functions, arguments, and operators as components of any of the expressions.

3. The system of claim 1 further including means permitting the user to insert additional IF, DO and OTHERWISE boxes in the display window, to add expressions for determining the value of other conditions and for performing calculations as a function of the value of the other conditions.

4. The system of claim 1 wherein any of the IF box, the DO box and the OTHERWISE box can be expanded to permit the viewing of a larger expression or calculation.

5. The system of claim 1 wherein the IF box contain an expression for selecting records from a database associated with the computer system.

6. A method for a user to enter into a computer system a calculation to be performed in response to a conditional expression, the computer system having a display and an input device, the method comprising the steps of:
   a. presenting on the display a DO box for entry of a first expression representing a first calculation to be performed in response to a first value of the conditional expression;
   b. introducing on the display, in response to insertion by the user, an IF BOX for entry of the conditional expression;
   c. introducing on the display, automatically in response to the introduction of the IF BOX, an OTHERWISE box for entry of a second expression representing a second calculation to be performed in response to a second value of the conditional expression;
   d. requiring the user to enter the first expression in the DO box, the conditional expression in the IF box, and the second expression in the OTHERWISE box before proceeding to step (e); and
   e. storing in the computer system the calculation, wherein the calculation represents the first calculation in response to the first value of the conditional expression and the second calculation in response to the second value of the conditional expression.

7. The method of claim 6 wherein the user may enter functions, arguments, and operators as components of any of the expressions.

8. The method of claim 6 including the additional step of introducing on the display, in response to insertion by the user, additional IF, DO and OTHERWISE boxes, to add expressions for determining the value of other conditions and for performing calculations as a function of the value of the other conditions.

9. The method of claim 6 wherein any of the IF box, the DO box and the OTHERWISE box can be expanded to permit the viewing of a larger expression or calculation.

10. The method of claim 6 wherein the IF box contains an expression for selecting records from a database associated with the computer system.

* * * * *

UNITED STATES PATENT AND TRADEMARK OFFICE
CERTIFICATE OF CORRECTION

PATENT NO. : 5,428,738
DATED : June 27, 1995
INVENTOR(S) : Carter et al.

It is certified that error appears in the above-identified patent and that said Letters Patent is hereby corrected as shown below:

Column 8, insert --b.-- at the beginning of line 19; insert --c.-- at the beginning of line 22; line 37, please delete the "." after the first word, "the"; line 40, change the last word "contain" to --contains--

Signed and Sealed this

Twenty-fourth Day of October, 1995

Attest:

BRUCE LEHMAN

*Attesting Officer*     *Commissioner of Patents and Trademarks*